(12) United States Patent
Sakata et al.

(10) Patent No.: US 9,720,634 B2
(45) Date of Patent: Aug. 1, 2017

(54) PRINT CONTROL DEVICE

(71) Applicant: RISO KAGAKU CORPORATION, Tokyo (JP)

(72) Inventors: Yukimoto Sakata, Ibaraki (JP); Shigeru Masuda, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/972,626

(22) Filed: Dec. 17, 2015

(65) Prior Publication Data

US 2016/0188272 A1 Jun. 30, 2016

(30) Foreign Application Priority Data

Dec. 26, 2014 (JP) .................................. 2014-264097

(51) Int. Cl.
*G06F 3/12* (2006.01)

(52) U.S. Cl.
CPC ............ *G06F 3/1256* (2013.01); *G06F 3/121* (2013.01); *G06F 3/1211* (2013.01); *G06F 3/1215* (2013.01); *G06F 3/1243* (2013.01); *G06F 3/1285* (2013.01)

(58) Field of Classification Search
None
See application file for complete search history.

(56) References Cited

U.S. PATENT DOCUMENTS

| 8,489,989 | B1 * | 7/2013 | Phillips | G06F 3/1208 715/277 |
| 8,817,292 | B1 * | 8/2014 | Rodriguez | G06F 3/1211 358/1.14 |
| 2004/0085558 | A1 * | 5/2004 | Minns | G06F 3/1205 358/1.11 |
| 2009/0195830 | A1 * | 8/2009 | Negishi | H04N 1/00408 358/1.15 |
| 2010/0123925 | A1 * | 5/2010 | Tomaru | G06F 3/1256 358/1.15 |
| 2011/0032562 | A1 * | 2/2011 | McCuen | G06F 3/1205 358/1.15 |

(Continued)

FOREIGN PATENT DOCUMENTS

JP 2006-119708 A 5/2006

OTHER PUBLICATIONS

Search Report issued by European Patent Office (EPO) patent office in European Patent Office (EPO) Patent Application No. 15201575.6, dated May 24, 2016.

*Primary Examiner* — Ted Barnes

(74) *Attorney, Agent, or Firm* — Greenblum & Bernstein, P.L.C.

(57) ABSTRACT

A print control device is configured to perform operations including: determining whether to execute a preflight processing for checking a print job based on a print setting information and a condition information specifying a condition for executing the preflight processing; upon determining to execute the preflight processing, executing the preflight processing and then generating a print output information for printing an image on a print sheet based on a print job information; and upon determining not to execute the preflight processing, generating the print output information based on the print job information without executing the preflight processing.

6 Claims, 5 Drawing Sheets

(56) References Cited

U.S. PATENT DOCUMENTS

2013/0258398 A1* 10/2013 Matsuo .............. G06K 15/1801
  358/1.15
2014/0078527 A1* 3/2014 Ono ...................... G06F 3/1211
  358/1.9

* cited by examiner

FIG. 4

| ID | CONDITION INFORMATION | | PRIORITY NUMBER |
|---|---|---|---|
| | CONDITION CONTENT | EXECUTION OR NON-EXECUTION OF PREFLIGHT PROCESSING | |
| 1 | CASE WHERE TOTAL NUMBER OF PAGES TO BE PRINTED IS EQUAL TO OR LESS THAN REFERENCE PAGE NUMBER; REFERENCE PAGE NUMBER 10 | NON-EXECUTION | 1 |
| 2 | CASE WHERE ALTERNATIVE FONT IS USED | NON-EXECUTION | 4 |
| 3 | CASE WHERE IMPOSITION IS NOT SET | NON-EXECUTION | 2 |
| 4 | CASE WHERE IMPOSITION IS SET | EXECUTION ONLY FOR FIRST PAGE | 3 |
| 5 | CASE OF FULL-COLOR PRINTING | EXECUTION | 5 |
| ⋮ | ⋮ | ⋮ | ⋮ |

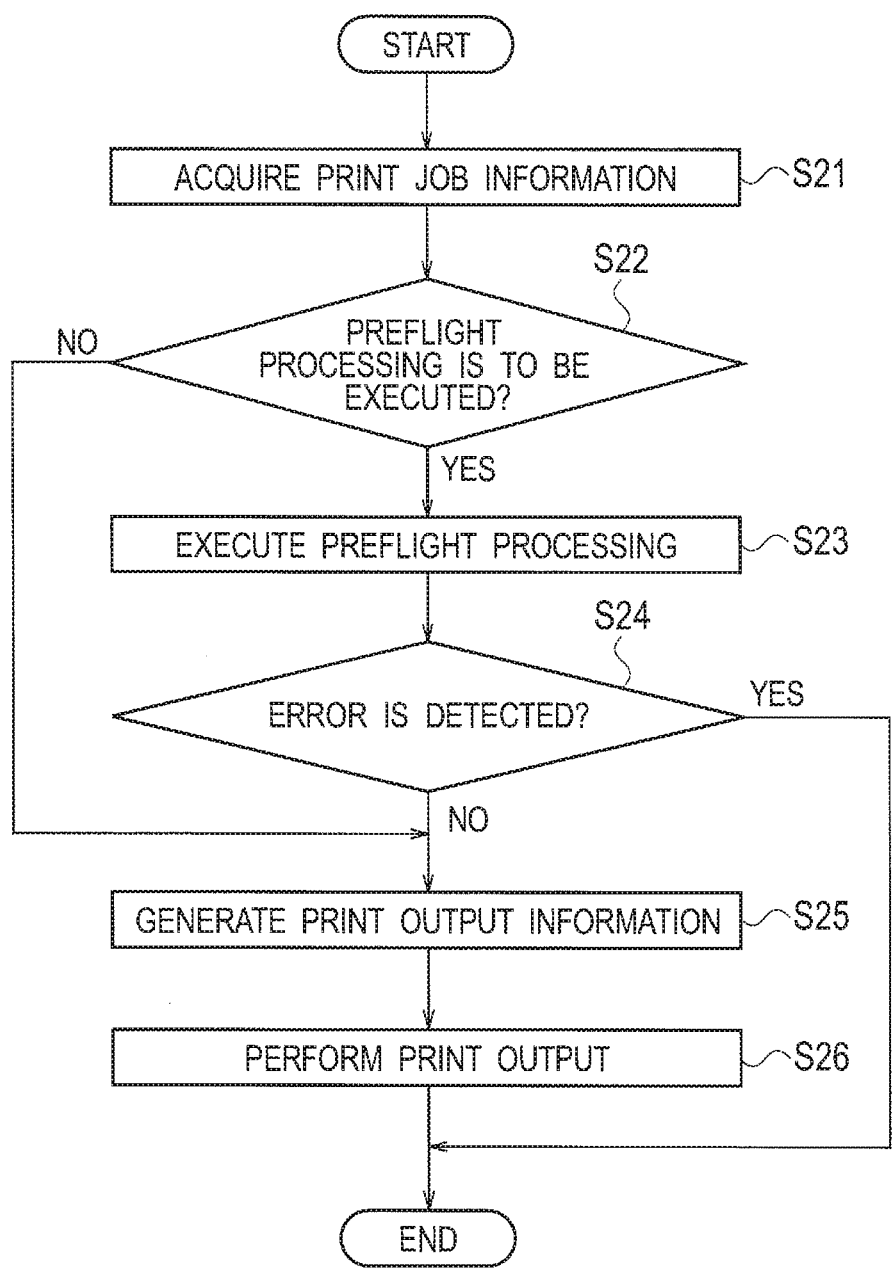

PRINT CONTROL DEVICE

CROSS REFERENCE TO RELATED APPLICATION

This application is based upon and claims the benefit of priority from the prior Japanese Patent Application No. 2014-264097, filed on Dec. 26, 2014, the entire contents of which are incorporated herein by reference.

BACKGROUND

1. Technical Field

The disclosure relates to a print control device configured to cause a print output device to print an image based on print job information.

2. Related Art

A printing apparatus includes a print output device configured to print an image and a print control device configured to control the print output device. The printing apparatus receives print job information from a terminal device such as a PC, and executes printing. The print job information is created in a PDL (Page Description Language) format, and the printing apparatus executes RIP (Raster Image Processor) processing on the received print job information to generate bitmap-format print output information. Then, the printing apparatus prints the image on a print sheet based on the generated print output information.

In the printing apparatus, preflight processing is generally performed prior to the RIP processing to avoid failure in printing. The preflight processing is, for example, processing of analyzing the syntax of the print job information by means of rough RIP processing in a reduced resolution and generating expanded data. The preflight processing is also applied to a syntax check of PDL and a user check by means of thumbnail or preview display. After the preflight processing, the printing apparatus prints the image on the print sheet based on the print output information generated in the RIP processing, if there is no problem in a check result.

In some cases, a printed matter based on print job information contains an enormous number of pages, such as several thousands of pages or more. In such a case, a lot of time is required to perform the preflight processing. This is one of the reasons hindering the printing apparatus from meeting demands of users desiring printing at a faster speed. Japanese Unexamined Patent Application Publication No. 2006-119708 proposes a printing apparatus in which a user can specify a range of pages to be subjected to the preflight processing. Since this printing apparatus can perform printing without performing the preflight processing for all pages, the print time can be reduced.

SUMMARY

Meanwhile, the printing apparatus of Japanese Unexamined Patent Application Publication No. 2006-119708 is configured to always perform the preflight processing even for the print job information which requires no preflight processing, and accordingly does not sufficiently satisfy demands of users desiring a reduction in a print time.

An object of the disclosure is to provide a print control device capable of executing the preflight processing and reducing the print time.

A print control device in accordance with some embodiments includes; a processor; and a memory including instructions that, when executed by the processor, cause the processor to perform operations. The operations include: acquiring a print job information for causing a print output device to print an image, the print job information including a print job and a print setting information required for execution of the print job; determining whether to execute a preflight processing for checking the print job, based on the print setting information and a condition information specifying a condition for executing the preflight processing; upon determining to execute the preflight processing, executing the preflight processing and then generating a print output information for printing the image on a print sheet based on the print job information; upon determining not to execute the preflight processing, generating the print output information based on the print job information without executing the preflight processing; and outputting the generated print output information to the print output device.

In the configuration described above, the print control device performs the operation of determining whether to execute the preflight processing, based on the print setting information and the condition information, the preflight processing performed to check the print job. Moreover, the print control device performs, depending on a result of the determination, the operation of generating the print output information after executing the certain preflight processing or generating the print output information without performing the certain preflight processing. In other words, the print control device executes only the necessary preflight processing determined based on the print setting information and the condition information. The print output information is thereby outputted without the preflight processing being executed when the preflight processing is unnecessary. Hence, a print time can be reduced.

The print control device may further include a storage configured to store a plurality of pieces of the condition information and priority numbers respectively associated with the plurality of pieces of the condition information. The operations may include: selecting one of the plurality of pieces of the condition information stored in the storage depending on the priority numbers, and determining whether to execute the preflight processing based on the print setting information and the selected, piece of the condition information.

In the configuration described above, for example, when a conflict occurs between results of determination based on the plurality of pieces of condition information in the determination of whether the preflight processing is to be executed, it is possible to select the condition information of a higher rank based on the priority number and determine whether to execute the certain preflight processing, based on the selected condition information. The printing can be thereby prevented from being stopped by an erroneous operation due to the conflict in the results of determination on whether the certain preflight processing is to be executed. Hence, it is possible to suppress an increase of the print time.

The print job information may include a cost priority mode information for printing giving priority to cost or a speed priority mode information for printing giving priority to speed. The operations may further include: upon the print job information including the cost priority mode information, determining to execute the preflight processing irrespective of the condition information; upon the print job information including the speed priority mode information, determining not to execute the preflight processing irrespective of the condition information.

In the configuration described above, it is possible to determine whether to execute the certain preflight processing, according to mode information corresponding to a user's demand such as the cost priority mode information or the speed priority mode information. Hence, it is possible to improve the convenience of the user in the execution of the print processing.

BRIEF DESCRIPTION OF DRAWINGS

FIG. 4 is a view illustrating an example of a table stored in a storage of the printing apparatus in the first embodiment of the present invention.

FIG. 5 is a flowchart illustrating operations of the printing apparatus in the first embodiment of the present invention.

DETAILED DESCRIPTION

Figure 1:
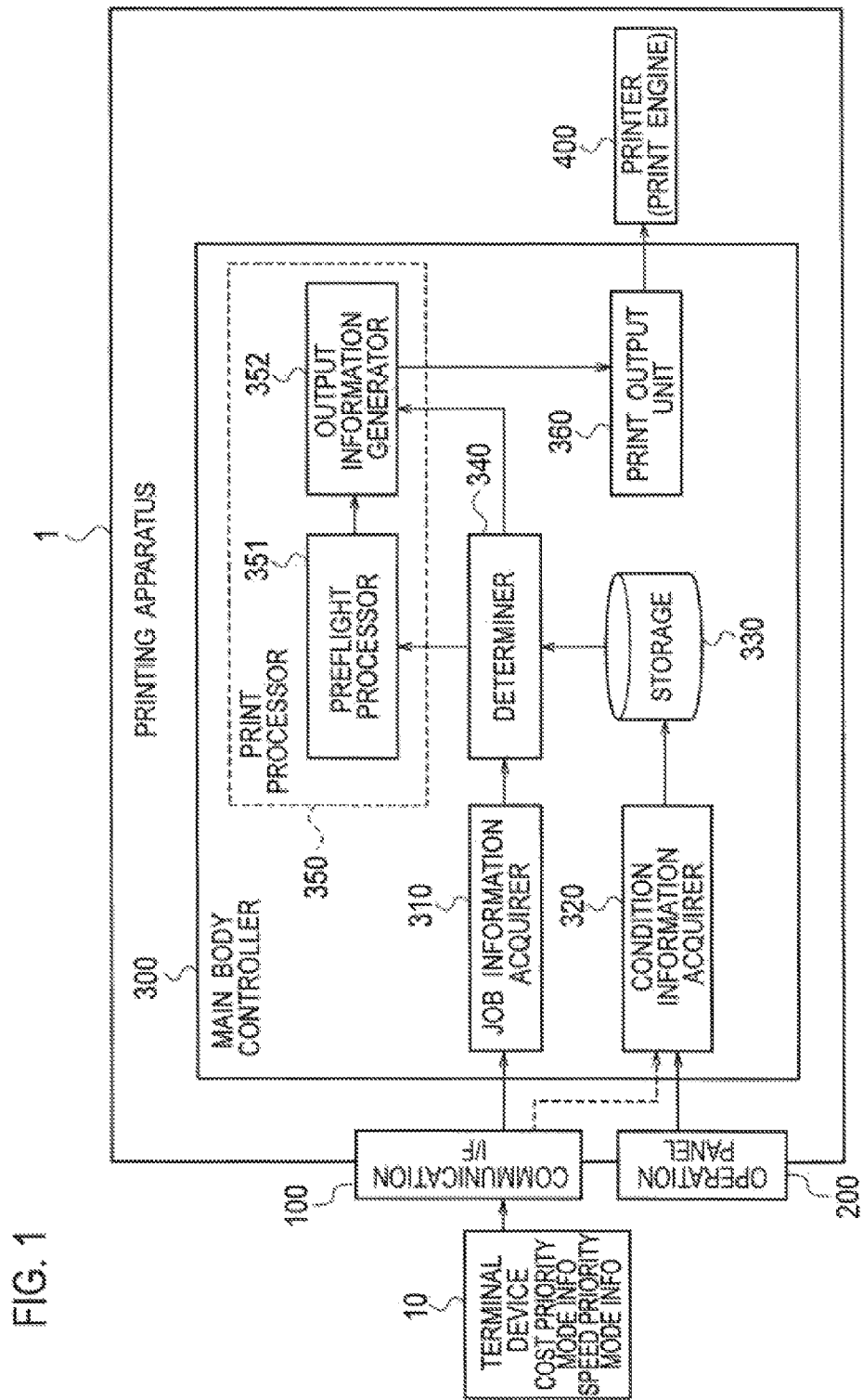
FIG. 1 is a block diagram illustrating a schematic configuration of a printing apparatus in a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

A first embodiment is described below with reference to the drawings.

First Embodiment

First, a configuration of a printing apparatus 1 is described. FIG. 1 is a schematic configuration diagram of the printing apparatus 1 in the first embodiment.

Schematic Configuration of Printing Apparatus 1

The printing apparatus 1 in the first embodiment receives print job information transmitted from a terminal device (client) 10 such as a PC, and prints images on print sheets based on the received print job information. The print job information includes a print job and print setting information required for execution of the print job.

As illustrated in FIG. 1, the printing apparatus 1 in the first embodiment includes a communication interface 100, an operation panel 200, a main body controller 300, and a printer (print engine) 400.

The communication interface 100 is a module configured to exchange information with the outside. In the embodiment, the communication interface 100 receives the print job information from the terminal device 10 used by a user. Communication herein includes, for example, an intranet (enterprise network), a home network, and the like and may be wired communication or wireless communication.

The operation panel 200 includes: a panel for displaying and inputting various types of information; and various operation keys such as numeric keys (the panel and the keys are not illustrated), and transmits operation signals based on user operations to the main body controller 300. The display-input panel of the operation panel 200 includes: a pressure-sensitive or capacitive transparent touch panel arranged on a front side; and a liquid crystal display panel arranged behind the touch panel and configured to display various display screens (both panels are not illustrated). The user can perform various input operations displayed in the display screens in the liquid crystal display panel by directly touching a surface of the touch panel with his/her finger while viewing the display screens.

The main body controller 300 controls various functions (processing) in the printing apparatus 1. The main body controller 300 is a computation module formed of: hardware including processors such as a CPU and a DSP (Digital Signal Processor), a memory, other electronic circuits, and the like; software such as programs and the like having functions of the hardware; or a combination of the hardware and the software. The computation module virtually construct various function modules by reading and executing the programs (commands) stored in the memory or the like as appropriate, and the constructed function modules perform processing related to image data, operation control of various units, and various types of processing for the user operation.

The main body controller 300 generates bitmap format print output information based on the print job information received via the communication interface 100. The main body controller 300 generates the print output information by executing RIP processing on the print job information. The main body controller 300 causes the printer 400 to execute print processing, based on the generated print output information.

Moreover, the main body controller 300 executes certain preflight processing on the print job information, and then generates the print output information when there is no problem in a result of a check using expanded data generated in the certain preflight processing.

In this case, the certain preflight processing is one of various types of preflight processing such as preflight processing of generating the expanded data for all of pages included in the print job information and preflight processing of generating the expanded data for a predetermined page range (one page, for example). In the following description, the certain preflight processing is simply referred to as preflight processing as appropriate. In the embodiment, description is given assuming that the preflight processing is processing of generating the expanded data used for a user check such as preview display.

Moreover, in the embodiment, the main body controller 300 forms a print control device configured to cause the printer 400 to print images based on the print job information. A detailed configuration of the main body controller 300 is described later.

The printer 400 includes at least a paper feeding mechanism configured to feed print sheets, an ink supplying mechanism configured to supply ink for printing, an ink head configured to print images on the print sheets by using the ink, and a paper discharging mechanism configured to discharge the print sheets subjected to printing (all mechanisms are not illustrated). The printer 400 executes the print processing of printing images on the print sheets according to the control of the main body controller 300. In the embodiment, the printer 400 forms a print output device configured to print images.

Configuration of Main Body Controller 300

Next, a configuration of the main body controller 300 is specifically described. As illustrated in FIG. 1, the main body controller 300 includes a job information acquirer 310, a condition information acquirer 320, a storage 330, a determiner 340, a print processor 350, and a print output unit 360.

The job information acquirer 310 acquires the print job information transmitted from the terminal device 10, via the communication interface 100.

The condition information acquirer 320 acquires condition information inputted by the user using the operation panel 200. Moreover, the condition information acquirer 320 acquires a priority number inputted together with the condition information by the user using the operation panel 200.

In this case, the condition information is information specifying a condition in response to which the preflight processing for checking the print job is executed. The condition information includes a condition content and information indicating execution or non-execution of the preflight processing (see FIG. 4). Moreover, the priority number is information indicating the rank of priority of each of multiple pieces of the condition information. (ID=1, 2, . . . ) (see FIG. 4).

The storage 330 includes a hard disk drive, a memory, or the like and stores various types of information used in the processing of the main body controller 300. In the embodiment, the storage 330 stores multiple pieces of the condition information and the priority numbers of the respective multiple pieces of condition information in association with one another.

The determiner 340 determines whether the preflight processing is to be executed, based on the print setting information included in the print job information and the condition information specifying the condition in response to which the preflight processing for checking the print job is to be executed.

The print setting information is setting information required for execution of the print job. For example, the print setting information is information such as information on the number of pages of print sheets, information on fonts for printing characters, information on setting of imposition processing, and information on color printing.

Meanwhile, when the determiner 340 determines whether the preflight processing is to be executed based on multiple pieces of condition information, the determiner 340 determines whether the preflight processing is to be executed based on the print setting information and the condition information selected depending on the priority number.

When the determiner 340 determines that the preflight processing is to be executed, the print processor 350 executes the preflight processing on the print job information and then generates the print output information for printing images on print sheets, based on the print job information. Meanwhile, when the determiner 340 determines that no preflight processing is to be executed, the print processor 350 generates the print output information based on the print job information without executing the preflight processing.

The print processor 350 specifically includes a preflight processor 351 and an output information generator 352.

The preflight processor 351 performs the preflight processing on the print job information. Specifically, the preflight processor 351 executes the preflight processing before RIP processing when the determiner 340 determines that the preflight processing is to be executed.

The output information generator 352 generates the print output information based on the print job information. Specifically, the output information generator 352 executes the RIP processing on the print job information and generates the bitmap-format print output information. The output information generator 352 can generate the print output information based on the print job information after the preflight processing is executed, or generate the print output information based on the print job information without the preflight processing being executed.

The print output unit 360 outputs the print output information to the printer 400 and also controls the printer 400 to execute the print processing of printing images on print sheets.

Operations of Printing Apparatus

Figure 2:
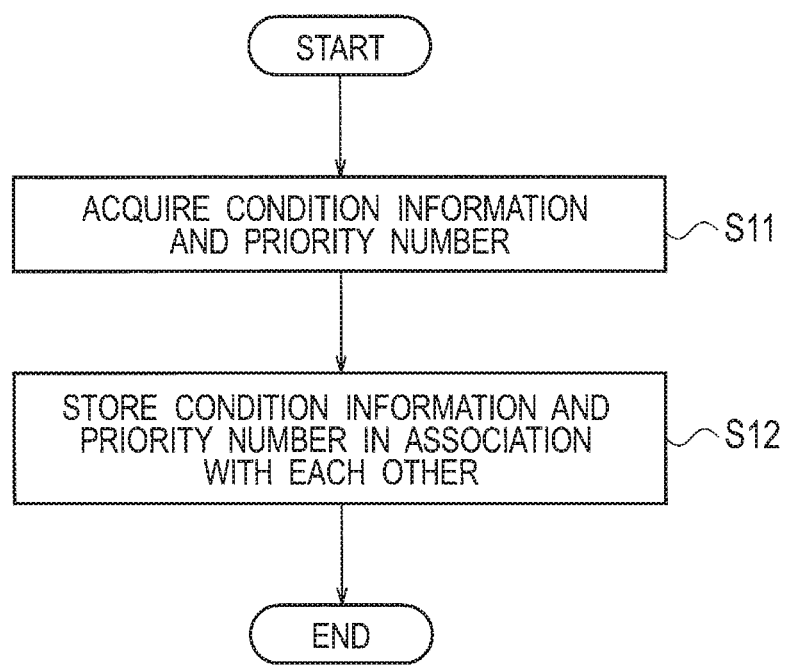
FIG. 2 is a flowchart illustrating operations of the printing apparatus in the first embodiment of the present invention.

Next, operations of the printing apparatus 1 are described. First, description is given of an operation performed when the printing apparatus 1 acquires the condition information. FIG. 2 is a flowchart illustrating the operation performed when the printing apparatus 1 acquires the condition information.

In step S11, in the printing apparatus 1, the condition information acquirer 320 acquires the condition information. At this time, the condition information acquirer 320 also acquires the priority number together with the condition information.

Specifically, the condition information acquirer 320 displays a preflight condition setting screen on the operation panel 200, the preflight condition setting screen configured to allow the user to input the condition information.

Figure 3:
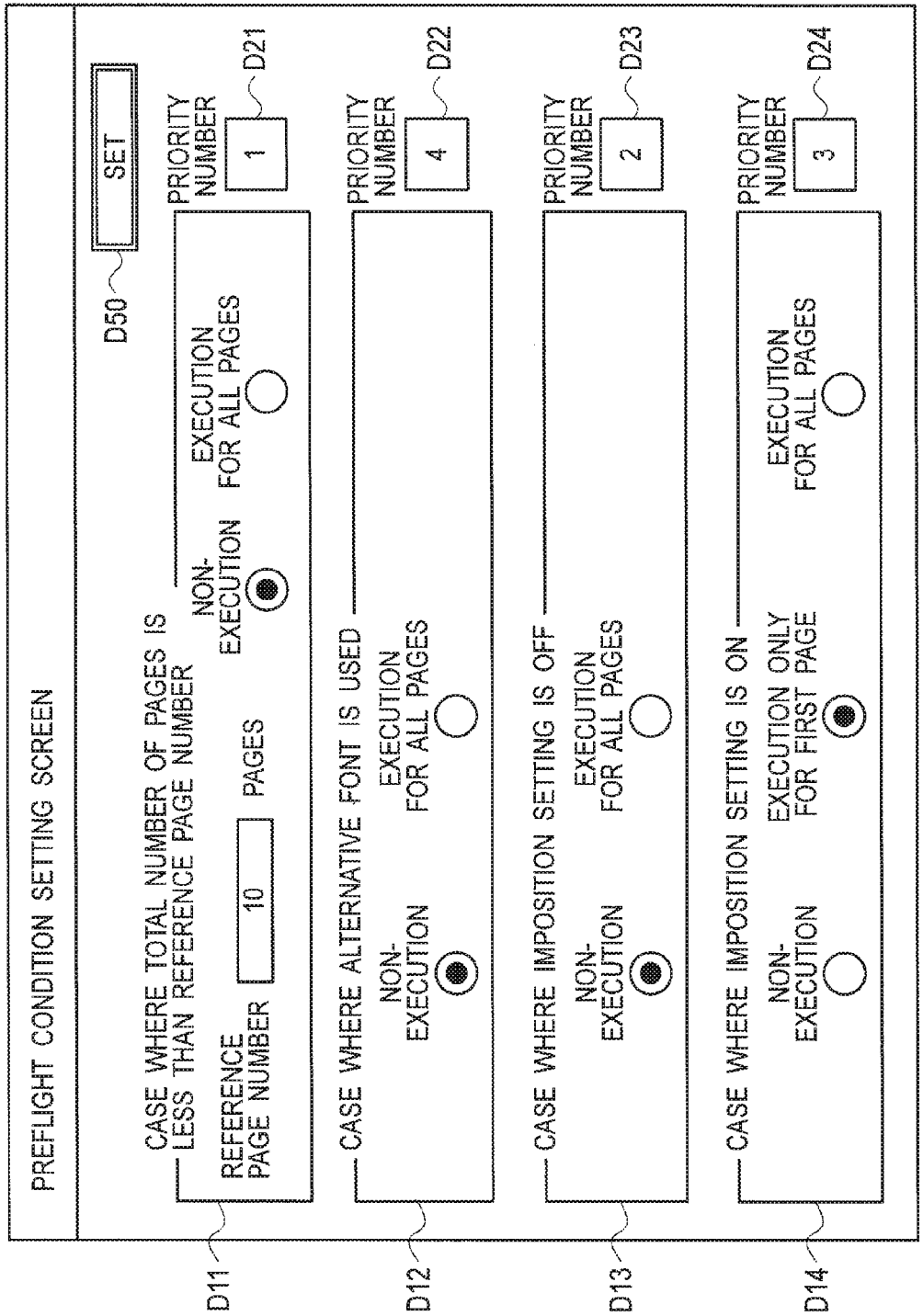
FIG. 3 is an explanatory diagram illustrating an example of a screen displayed in the printing apparatus in the first embodiment of the present invention.

FIG. 3 illustrates an example of the preflight condition setting screen displayed on the operation panel 200. As illustrated in FIG. 3, the preflight condition setting screen includes an input region D11 showing a condition content of "case where total number of pages is less than reference page number", an input region D12 showing a condition content of "case where alternative font is used", an input region D13 showing a condition content of "case where imposition setting is OFF", and an input region D14 showing a condition content of "case where imposition setting is ON."

The condition content of "case where total number of pages is less than reference page number" is the case where the number of pages of the print sheets based on the print job information is less than a specified reference page number.

The condition content of "case where alternative font is used" is the case where an alternative font is used to substitute a font used to express characters included in the print job information.

The condition content of "case where imposition setting is OFF" is the case where no imposition processing is executed. The imposition processing is processing of generating the print output information based on the print job information in such a way that images to be printed are arranged (laid out) in a way appropriate to printing, cutting, and book binding.

The condition content of "case where imposition setting is ON" is the case where the imposition processing is executed.

The condition information acquirer 320 acquires the condition information including information inputted into the input regions D11 to D14 in the preflight condition setting screen. For example, regarding the content illustrated in the input region D11 of FIG. 3, the condition information acquirer 320 acquires the condition information including the condition content of "case where total number of pages is less than reference page number," the reference page number "10," and "no execution" indicating execution or non-execution of the preflight processing.

Meanwhile, as illustrated in the input region D14, the condition information acquirer 320 may acquire the condition information in which information permitting the preflight processing only for a predetermined page range such as "execution only for first page" is included as the information indicating execution or non-execution of the preflight processing.

Moreover, the condition information acquirer 320 acquires the priority numbers inputted respectively into input regions D21 to D24 and the pieces of condition information inputted into the input regions D11 to D14 in the preflight condition setting screen in association with one another. For example, the condition information acquirer 320 acquires the priority number "1" inputted into the input region D21 while associating the priority number "1" with the condition information inputted into the input region. D11.

Next, in step S12, the condition information acquirer 320 stores the pieces of condition information and the priority numbers in the storage 330 in association with one another. FIG. 4 illustrates an example of a table in the storage 330 in which the pieces of condition information and the priority numbers are stored in association with one another. As illustrated in FIG. 4, the condition information acquirer 320 creates one record in which the condition information and the priority number are associated with each other, and stores the record in the storage 330.

In the printing apparatus 1, the condition information and the priority numbers are acquired as described above. Note that the aforementioned operation of the printing apparatus 1 is executed at any timing desired by the user.

Next, an operation of the printing apparatus 1 upon receiving the print job information is described. FIG. 5 is a flowchart illustrating the operation of the printing apparatus 1 upon receiving the print job information.

In step S21, in the printing apparatus 1, the job information acquirer 310 acquires the print job information from the terminal device 10 via the communication interface 100.

In step S22, the determiner 340 determines whether the preflight processing is to be executed, based on the print setting information and the condition information.

Specifically, first, the determiner 340 refers to the storage 330 and acquires the condition information stored in the storage 330. For example, the determiner 340 acquires the condition information including the condition content of "case where total number of pages is less than reference page number" (reference page number: 10)" and "non-execution" which is the information indicating execution or non-execution of the preflight processing.

Next, the determiner 340 acquires the print setting information included in the print job information. For example, the determiner 340 acquires the print setting information indicating the number of pages of print sheets from the print setting information included in the print job information.

Then, the determiner 340 determines whether the number of pages (for example, five pages) indicated by the print setting information satisfies the condition content of "case where total number of pages is less than reference page number (reference page number: 10)" in the condition information.

When the determiner 340 determines that the condition content in the condition information is satisfied, the determiner 340 determines whether the preflight processing is to be executed, according to the information on indicating execution or non-execution of the preflight processing and included in the condition information. When the determination is made based on the table illustrated in FIG. 4, the determiner 340 determines that no preflight processing is to be executed, according to "non-execution" which is the information indicating execution or non-execution of the preflight processing and included in the condition information (step S22; NO).

Meanwhile, when the determiner 340 determines that the number of pages (for example, 100 pages) indicated by the print setting information does not satisfy the condition content of "case where total number of pages is less than reference page number (reference page number: 10)" in the condition information, the determiner 340 determines that the preflight processing is to be executed (step S22; YES). In other words, the determiner 340 determines that the preflight processing is to be executed, without referring to the information indicating execution and non-execution of the preflight processing and included in the condition information.

Note that, in step S22, when the determiner 340 refers to the storage 330 and multiple pieces of condition information are stored in the storage 330, the determiner 340 determines whether the preflight processing is to be executed, based on the priority numbers stored in association with the pieces of condition information.

In this case, the determiner 340 selects the condition information associated with "1" which is the priority number of the highest rank, and determines whether the preflight processing is to be executed based on the selected condition information and the print setting information.

In this case, the determiner 340 may determine, multiple times, whether the preflight processing is to be executed, based on multiple pieces of condition information and multiple pieces of print setting information corresponding to the multiple pieces of condition information and, when there is a conflict between multiple determination results, determine whether the preflight processing is to be executed, based on the print setting information and the condition information associated with "1" which is the priority number of the highest rank.

In step S23, when the determiner 340 determines that the preflight processing is to be executed (step S22; YES), the print processor 350 executes the preflight processing on the print job information.

In step S24, the print processor 350 determines whether an error is detected in the expanded data generated in the preflight processing. For example, the print processor 350 prompts the user to perform a check by displaying a preview of the expanded data on the operation panel 200. Then, after presence or absence of an error is checked by the user, the print processor 350 determines whether an error is detected, depending on a check result inputted by the user.

In this case, the print processor 350 may display preview suggesting information indicating that the preview display of the expanded data is possible, before the preview display, and display the preview only when the user inputs a preview display request as a response to the preview suggesting information.

Then, when the print processor 350 determines in step S24 that an error is detected in the preflight processing (step S24; YES), the print processor 350 terminates the operation without executing the print processing.

In step S25, when the print processor 350 determines that no error is detected in the preflight processing (step S24; NO), the print processor 350 generates the print output information based on the print job information.

Then, in step S26, the print output unit 360 outputs the print output information to the printer 400 and also controls the printer 400 to execute the print processing of printing images on print sheets.

Operations and Effects

As described above, in the printing apparatus 1 of the first embodiment, the determiner 340 determines whether the preflight processing is to be executed, based on the print setting information included in the print job and the condition information.

Furthermore, in the printing apparatus 1, the print processor 350 generates the print output information based on the print job after executing the preflight processing or generates the print output information without performing the preflight processing, depending on the determination result of the determiner 340. In other words, the printing apparatus 1 executes the preflight processing only when determining that the preflight processing is necessary, based on the print setting information and the condition information. The printing apparatus 1 thus prints images on print sheets without executing the preflight processing when the preflight processing is unnecessary, and the print time can be thereby reduced.

Moreover, in the printing apparatus 1 of the embodiment, when multiple pieces of condition information are stored in the storage 330, the determiner 340 determines whether the preflight processing is to be executed, based on the print setting information and the condition information selected depending on the priority number. Due to this, when there is a collision between determination results of the determination based on the multiple pieces of condition information, the determiner 340 can determine whether the preflight processing is to be executed by selecting the condition information with a priority number of the highest rank. Accordingly, in the printing apparatus 1, it is possible to prevent printing from being stopped by an erroneous operation due to the determination result of the determiner 340.

Second Embodiment

Next, a second embodiment is described. A case where the user desires printing giving priority to print cost reduction or a case where the user desires printing giving priority to print speed in the print processing are conceivable.

For example, from a view point of giving priority to the print cost reduction, it is preferable that printing is performed after executing the preflight processing, because the cost wasted by the print processing is great when printing error occurs in execution of full-color printing of many sheets and execution of printing of a booklet. Meanwhile, from a view point of giving priority to the print speed, it is preferable that printing is performed without executing the preflight processing.

The printing apparatus 1 in the embodiment has a function provided in consideration of the points described above. Specifically, the print job information in the embodiment includes cost priority mode information for printing giving priority to cost or speed priority mode information for printing giving priority to speed.

Note that the cost priority mode information or the speed priority mode information is selected by user input performed in the terminal device 10, and is included in the print job information.

In the embodiment, the main body controller 300 includes a mode determiner which determines that the preflight processing is to be executed, in preference to the determination by the determiner 340 (i.e. irrespective of the condition information), when the cost priority mode information is included in the print job information, and which determines that no preflight processing is to be executed, in preference to the determination by the determiner 340 (i.e. irrespective of the condition information), when the speed priority mode information is included in the print job information. Although not illustrated, the mode determiner may be configured to be connected to the job information acquirer 310, the storage 330, the determiner 340, and the print processor 350 to exchange various types of information or may be provided as one of the functions of the determiner 340. In the following description, the case where the mode determiner is provided as one of the functions of the determiner 340 is given as an example.

In the printing apparatus 1 of the embodiment, it is assumed that the preflight processing is performed irrespective of the condition on information when the cost priority mode information is included in the print job information. Accordingly, the storage 330 stores a cost priority mode preflight processing execution correspondence table in addition to the correspondence table of FIG. 4, and the determiner 340 determines a kind of preflight processing to be performed, by using the cost priority mode preflight processing execution correspondence table.

The cost priority mode preflight processing execution correspondence table stores information indicating a kind of preflight processing to be performed. Specifically, in the cost priority mode preflight processing execution correspondence table, for example, a condition content of "case where total number of pages to be printed is equal to or greater than a predetermined page number" and a preflight processing content of "execute for all pages" are stored in association with each other, and a condition content of "full-color printing" and a preflight processing content of "execute for all pages" are stored in association with each other.

As described above, in the cost priority mode, the determiner 340 determines a kind of preflight processing to be performed by referring to the cost priority mode preflight processing execution correspondence table, and the print processor 350 generates the expanded data by executing the preflight processing according to the determination and also generates the print output information. Meanwhile, when the determiner 340 cannot find an appropriate kind of preflight processing by referring to the cost priority mode preflight processing execution correspondence table, the determiner 340 determines that the preflight processing is to be executed for all pages.

In the cost priority mode preflight processing execution correspondence table, the condition contents and the preflight processing contents may be created by a predetermined default condition, or may be created by a condition inputted by the user following a preflight condition setting screen like one illustrated in FIG. 3, instead of the predetermined default condition.

Meanwhile, when the speed priority mode information is included in the print job information, the determiner 340 determines that no preflight processing is to be executed irrespective of the condition information, and the print processor 350 generates the print output information based on the print job information without executing the preflight processing.

When no cost priority mode information or speed priority mode information is included in the print job information, the determiner 340 performs the operations in step S22 and subsequent steps in FIG. 5.

As described above, since the printing apparatus 1 of the embodiment determines whether to execute the preflight processing according to mode information taking in consideration of the desire of the user such as the cost priority mode information and the speed priority mode information, convenience of the user can be improved in the execution of the print processing.

In the embodiment, the cost priority mode information or the speed priority mode information is included in the print job information in the terminal device 10 by being selected by the user in the terminal device 10. However, the invention is not limited to this example. The terminal device 10 may generate the print job information including the cost priority mode information without the selection by the user, when the print job is that for full-color printing or printing requiring a syntax check such as printing of a booklet. Moreover, the terminal device 10 may generate the print job information including the speed priority mode information when the print job is that for monochrome printing of one sheet.

Modified Example 1 of Second Embodiment

Next, modified example 1 of the second embodiment is described. In the second embodiment described above, the determiner 340 (mode determiner) determines that no preflight processing is to be executed when the speed priority mode information is included in the print job information. However, the invention is not limited to this example.

For example, the preflight processing may be executed only for a predetermined number of pages (for example, for one page at minimum) when the determiner 340 determines that no preflight processing is to be executed.

Moreover, when the cost priority mode information is included in the print job information and the determiner 340 cannot find an appropriate kind of preflight processing by referring to the cost priority mode preflight processing execution correspondence table, the determiner 340 determines that the preflight processing is to be executed for all pages. However, the invention is not limited to this example. The determiner 340 may determine that the preflight processing is to be executed only for a predetermined number of pages (for example, one page at minimum). The determiner 340 may receive the predetermined number of pages from the user.

As described above, in the printing apparatus 1 of the embodiment, the preflight processing is executed only for the predetermined number of pages when the speed priority mode information is included in the print job information. The preflight processing can be thereby executed for the minimum number of pages. Accordingly, a minimum check of the print job can be executed with the time reduced.

Moreover, the printing apparatus 1 of the embodiment executes the preflight processing only on the predetermined number of pages when the cost priority mode information is included in the print job information. Accordingly, a minimum check of the print job can be executed with the time reduced compared to the case where the preflight processing executed for all pages.

Modified Example 2 of Second Embodiment

Next, modified example 2 of the second embodiment is described. In the aforementioned second embodiment, description is given of the example in which the print job information including the cost priority mode information may be generated without the user selection when the print job is that for the full-color printing or the printing requiring a syntax check such as the printing of a booklet.

In this case, when the cost priority mode information is included in the print job information and, as a result, the expanded data is generated in the preflight processing without being recognized by the user as described above, processing such as preview display using the expanded data sometimes may not be performed. In such cases, there is no need to perform the preflight processing. The printing apparatus 1 of the embodiment has a function taking in consideration of such a point.

When the cost priority mode information is included in the print job information, the printing apparatus 1 of the embodiment determines whether to execute the preflight processing, based on a past processing history such as whether the preview display or the like has been actually performed.

Specifically, in the printing apparatus 1 of the embodiment, the storage 330 further includes a cost priority mode history table which the determiner 340 (mode determiner) refers to. The cost priority mode history table stores job class information and preflight execution instruction information in association with each other, the preflight execution instruction information indicating whether the preflight processing is to be executed.

The job class information is one or a combination of multiple pieces of information such as, for example, information on the data size of the print job included in the print job information and information on whether the print job is color. The job class information can be also referred to as information for classifying an attribute of the print job related to the cost priority mode, and is included in the print setting information.

In the embodiment, when the job information acquirer 310 acquires new print job information including the cost priority mode information, the determiner 340 searches the cost priority mode history table, based on the job class information (hereafter, described as target job class information) included in the new print job. When the determiner 340 finds the job class information matching the target job class information, the determiner 340 determines whether the preflight processing is to be executed, according to the preflight execution instruction information stored in association with the found job class information.

Meanwhile, when the determiner 340 cannot find the job class information matching the target job class information from the cost priority mode history table, the determiner 340 refers to the cost priority mode preflight processing execution correspondence table described in the second embodiment, and determines a kind of preflight processing to be performed.

The cost priority mode history table is created and updated as follows. Specifically, for print job information including the cost priority mode information, the determiner 340 stores the job class information in the print job information and the preflight execution instruction information of "do not execute preflight processing" in association with each other in the cost priority mode history table, when the number of times the preview display or the like for the print job information is not performed even if the preflight processing is executed reaches or exceeds a predetermined number. The predetermined number may be one or more.

Moreover, assume a case where, despite that certain job class information is stored in association with the preflight execution instruction information of "do not execute preflight processing" in the cost priority mode history table, the preflight processing is executed on print job information including the certain job class information by an input operation by the user and the preview display is performed.

In this case, the determiner 340 may rewrite the preflight execution instruction information to "execute preflight processing."

As described above, in the printing apparatus 1 of the embodiment, the determiner 340 refers to the cost priority mode history table and determines whether the preflight processing is to be executed, based on the past processing history of whether the preview display or the like has been actually performed. The preflight processing is thus performed only when needed. Accordingly, it is possible to reduce processing load wasted due to unnecessary preflight processing and to also execute the preflight processing depending on the necessity of the preflight processing for each user.

In the aforementioned example, description is given of the case where the cost priority mode information is included in the print job information. Similarly, in the case where the speed priority mode information is included in the print job information, the determiner 340 can determine whether the preflight processing is to be executed, based on the past processing history of whether the preview display or the like has been actually performed.

Specifically, when the speed priority mode information is included in the print job information, no preflight processing is performed in the aforementioned second embodiment. However, in the embodiment, the determiner 340 refers to a speed priority mode history table to determine whether the preflight processing is to be executed. The speed priority mode history table stores the job class information and the preflight execution instruction information indicating whether the preflight processing is to be executed in association with each other.

The speed priority mode history table is created and updated as follows. When the determiner 340 searches the speed priority mode history table and cannot find the job class information matching the target job class information from the speed priority mode history table, the determiner 340 displays a screen asking the user whether the preview display is necessary or not. Then, when the user inputs a request for the preview display, the determiner 340 causes the preflight processing to be executed and the preview display is performed. In this case, the determiner 340 stores the target job class information and the preflight execution instruction information of "execute preflight processing" in the speed priority mode history table in association with each other.

Moreover, when the user does not actually perform the preview display after the aforementioned operation, the preflight execution instruction information may be rewritten to "execute no preflight processing." Note that, although description is given above of the example in which the determiner 340 rewrites the preflight execution instruction information, the print processor 350 may perform the rewriting.

Other Embodiments

For example, in the aforementioned embodiments, the preview display and the like are performed in the printing apparatus 1. However, the present invention is not limited to this example, and the preview display may be performed as follows. The main body controller 300 executes the preflight processing, generates the expanded data, and transmits the expanded data to the terminal device 10, and the terminal device 10 performs the preview display.

Moreover, in the aforementioned embodiments, the preflight processing is described as processing of generating the expanded data used for user checks such as the preview display. However, the preflight processing may be processing for checks in which a device checks for errors and abnormality in the print job, such as a syntax check.

Furthermore, in the aforementioned embodiments, the printing apparatus 1 is configured to execute the preflight processing. However, in the case where the preflight processing is determined in advance to be always executed, for example, as in the case where the print job is that for full-color printing or for printing requiring a syntax check such as printing of a booklet, the terminal device 10 may create the expanded data by executing the preflight processing and generate the print job information including the created expanded data. When the expanded data is included in the print job information acquired from the terminal device 10, the printing apparatus 1 can promptly execute the processing (step S24) of determining whether an error is detected in the expanded data generated in the preflight processing. Accordingly, the print time can be reduced also in printing requiring the preflight processing.

Moreover, in the aforementioned embodiments, the condition information acquirer 320 is configured to acquire the condition information and the priority numbers which are inputted into the operation panel 200. However, the present invention is not limited to this example. The condition information acquirer 320 may acquire the condition information and the priority numbers which are inputted by using the terminal device 10 or the condition information and the priority numbers which are stored in an external server, via the communication interface 100.

Furthermore, in the aforementioned embodiments, description is given of the example in which the printing apparatus 1 includes the main body controller 300 forming the print control device and the printer 400 forming the print output device. However, the present invention is not limited to this example. The main body controller 300 forming the print control device and the printer 400 forming the print output device may be formed respectively in separate bodies. Specifically, the main body controller 300 forming the print control device may be provided outside the printing apparatus 1.

Moreover, in the aforementioned embodiments, the storage 330 stores the condition information and the priority numbers in association with each other. However, the priority numbers are not always necessary, and the storage 330 only needs to store at least the condition information.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A print control device comprising; a processor; and a memory including instructions that, when executed by the processor, cause the processor to perform operations including:

acquiring print job information for causing a print output device to print an image, the print job information including a print job and a print setting information required for execution of the print job;

determining whether to execute a preflight processing for checking the print job, based on the print setting information and a condition information specifying a condition for executing the preflight processing;

upon determining to execute the preflight processing, executing the preflight processing and then generating print output information for printing the image on a print sheet based on the print job information;

upon determining not to execute the preflight processing, generating the print output information based on the print job information without executing the preflight processing; and outputting the generated print output information to the print output device wherein the print control device further comprises a storage configured to store a plurality of pieces of the condition information and priority numbers respectively associated with the plurality of pieces of the condition information, and wherein the operations include:

selecting one of the plurality of pieces of the condition information stored in the storage depending on the priority numbers, and determining whether to execute the preflight processing based on the print setting information and the selected piece of the condition information wherein the plurality of pieces of the condition information specify at least one of:

a condition that a total number of pages of print sheets to be produced based on the print job information is less than a reference page number, and an indication of whether preflight processing is to be performed when said condition is satisfied;

a condition that no imposition processing is to be executed, and an indication of whether preflight processing is to be performed when said condition is satisfied;

a condition that imposition processing is to be executed, and an indication of whether preflight processing is to be performed when said condition is satisfied; and a condition that an alternative font is to be used as a substitute for a font used to express characters included in the print job information, and an indication of whether preflight processing is to be performed when said condition is satisfied.

2. The print control device according to claim 1, wherein the print job information includes a cost priority mode information for printing, that gives priority to cost or a speed priority mode information for printing, that gives priority to speed, and the operations further include:
upon the print job information including the cost priority mode information, determining to execute the preflight processing, regardless of the condition information;
upon the print job information including the speed priority mode information, determining not to execute the preflight processing, regardless of the condition information.

3. The print control device according to claim 2, wherein at least one of the plurality of pieces of the condition information specifies whether preflight processing is to be performed only on a predetermined page range when the respective condition is satisfied.

4. The print control device according to claim 2, wherein at least one of the plurality of pieces of the condition information specifies whether preflight processing is to be performed for all pages when the respective condition is satisfied.

5. The print control device according to claim 1, wherein the instructions, when executed by the processor, cause the processor to acquire the plurality of pieces of the condition information and the priority numbers from a user operation panel, a terminal device or an external server, and to store the acquired plurality of pieces of the condition information in association with the respective acquired priority numbers in the storage.

6. The print control device according to claim 1, wherein determining whether to execute a preflight processing comprises determining whether to execute preflight processing for all pages, for some pages, or for no pages of a print job.

* * * * *